UNITED STATES PATENT OFFICE.

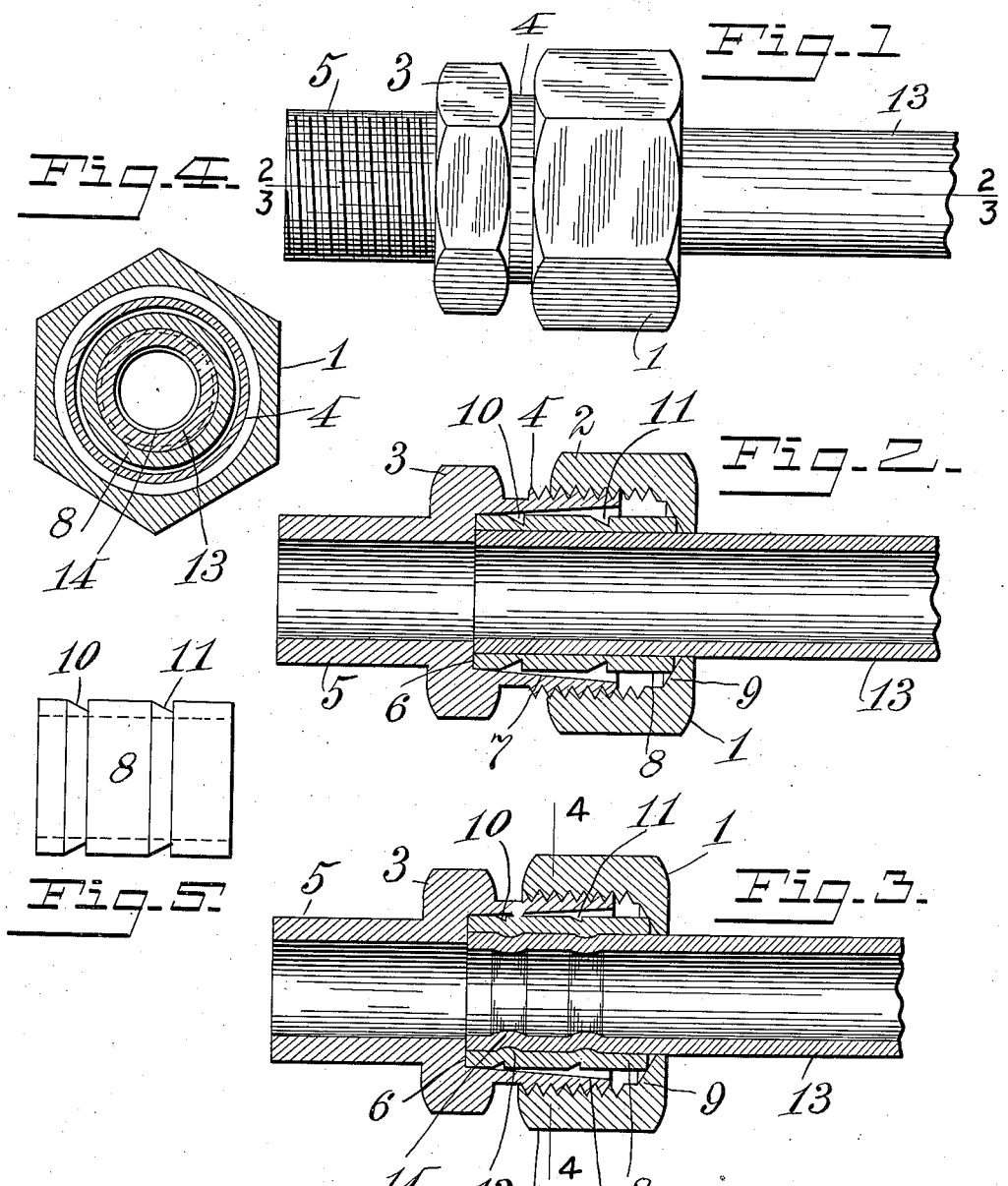

JOHN H. DOHNER, OF DAYTON, OHIO.

PIPE-COUPLING.

1,307,540.　　　　　　　Specification of Letters Patent.　　Patented June 24, 1919.

Application filed April 14, 1919.　Serial No. 289,936.

*To all whom it may concern:*

Be it known that I, JOHN H. DOHNER, a citizen of the United States, residing at Dayton, in the county of Montgomery and State of Ohio, have invented certain new and useful Improvements in Pipe-Couplings, of which the following is a specification.

This invention relates to improvements in couplings for connecting piping or tubing, and the object thereof is to provide a coupling for connecting piping or tubing formed of metal that is softer than that of the coupling parts themselves and by means of which sections of such piping may be connected in accurate alinement without the use of solder or soft packing of any kind. And incidental thereto a further object of the invention is to provide a coupling which safeguards any looseness or possible disconnection of the coupled pipe sections that might be otherwise due to a vibration thereof or pressure exerted thereon.

In advance of a more specific description of the invention reference is made in general terms to the accompanying drawings which fully illustrate the same. Of these drawings Figure 1 is an elevation of the coupling applied to a section of piping. Fig. 2 is a longitudinal section showing the coupling applied to the end of a tube or pipe and prior to the compression of the sleeve which connects it with said tube. Fig. 3 is a similar illustration after the compression of the coupling sleeve to connect it with the tube is applied. Fig. 4 is a cross section of the line 4—4 of Fig. 3, and Fig. 5 is an elevation of the coupling sleeve removed.

More particularly describing the elements comprising the invention by the application of reference characters, the coupling comprises a movable compression member in the form of an exterior nut —1— having an interiorly threaded cylindrical extension —2—. Coöperating therewith is a female member or cap nut 3 having an exteriorly threaded nipple 4 which engages the threads of the member 1, and a stem 5 around the bore of which is formed a seat or shoulder 6. The threaded extension 4 is suitably tapered on its interior as at 7. By turning the outer one of these two main parts of the coupling it will be readily seen the said parts may be drawn together or separated as in tightening or loosening the said coupling. On the interior thereof lies a sleeve 8 one end of which engages the shoulder 6 of the female member 3 of the coupling and the other end of which engages the interior wall 9 of the movable member 1 of the coupling, and it will therefore be seen that in screwing said member 1 onto the nipple 4 longitudinal pressure will be exerted upon the coupling sleeve 8. The said sleeve 8 is of cylindrical form, the inner diameter being uniform as well as the outer diameter before compression. On the exterior surface of said sleeve are formed two circumferential grooves 10—11, the former being nearer one end of the sleeve, to wit, the end which abuts against the interior shoulder of the nipple 5. One side of each of said grooves is straight while the other side is tapered and by means of the formation of said grooves interior circumferential beads 12 are formed at these points when the sleeve is compressed longitudinally by tightening the nut or movable coupling member 1. The tube or pipe 13, which has been previously inserted in the coupling, is essentially of softer metal than the sleeve 8 and by reason thereof the beads 12 embed themselves into the surrounding circumference of said tube and thus form interlocking grooves 14 in the surface thereof.

When the parts are assembled as in Fig. 2 the tube 13 is introduced until it meets with the shoulder 6 of the nipple and thus lies flush with the adjacent end of the sleeve 8, the said sleeve extending out of the nipple and engaging the wall of the nut 1. The inward end of the sleeve or that which contains the groove 10 lies in the smallest diameter of the nipple. Owing to the bore of the nipple being on a taper, as hereinbefore indicated, the portion of the sleeve 8 lying between the grooves 10 and 11 is permitted to have the slight necessary expansion or to increase in diameter slightly under the compression necessary to form the interior beads 12, without causing any binding effect between the said sleeve and the nipple, and therefore the coupling may be removed with entire convenience.

It will be seen from Fig. 3 that after the sleeve 8 has been compressed to form the internal beads 12 that interlock with the tube, the said sleeve has been shortened thereby.

The shoulder 9 of the nut 1 is tapered in order to decrease the surface contact between said shoulder and the end of the sleeve. As appears in the drawings the outer edge only of the end of the sleeve contacts with the shoulder 9. Such being the case, when the said sleeve is compressed by screwing up the nut 1 an effective seal is formed at that point due to the sharp edge of the sleeve embedding itself to a more or less extent into the seat 9. The longitudinal compression of the sleeve 8 necessary to form the beads 12 is relatively small and this is true also of the amount of expansion that takes place in the sleeve at that time. While the invention is referred to broadly under the term of pipe coupling its chief utility is in connection with copper tubing or tubing of such ductile character that it will not resist the pressure exerted upon it at the points of the beads 12. The sleeve 8 is shown to have two of the surface grooves 10—11 and consequently two beads 12, after compression, and this is the preferred form of construction. The sleeve may, however, be effective in some cases with a single groove and consequently a single bead after compression.

Having described my invention, I claim:

1. In a coupling for uniting tubing formed of ductile material, the combination with interiorly and exteriorly threaded members, of a sleeve arranged therein with its ends inclosed between the interior perpendicular walls of said threaded members, said sleeve having external circumferential grooves which enable the formation of internal circumferential grooves therein which interlock with matching grooves formed in the tubing when said sleeve is compressed longitudinally between said threaded members.

2. In a coupling for uniting tubing, the combination with male and female coupling members one of which has an interiorly tapered nipple, of a sleeve of ductile material and uniform diameter inclosed within said male and female members with its ends abutting the interior perpendicular shoulders of said members and having outer circumferential grooves therein, said sleeve being adapted to receive a pipe of softer material and to interlock with the same through the formation of interior circumferential beads which are subsequently formed on said sleeve and become embedded in circumferential grooves subsequently formed in the pipe, through the longitudinal compression of the sleeve between said male and female coupling members.

3. In a pipe coupling, the combination with a nipple and an engaging nut, of a sleeve of ductile metal and of uniform diameter arranged within said nipple with the ends thereof abutting with shoulders in said nipple and engaging nut, said sleeve having outer circumferential grooves formed therein that lie within the length of the nipple and by means of which interior circumferential beads are formed on said sleeve when it is compressed longitudinally and whereby said sleeve interlocks with a pipe of softer metal which is placed therein prior to said compression.

4. In a coupling of the character described, the combination with threaded coupling members one of which comprises an interiorly tapered nipple, of a sleeve formed of ductile metal within said nipple with its ends abutting interior shoulders on said coupling members, said sleeve having outer circumferential grooves which produce circumferential ribs on the interior of said sleeve when said sleeve is compressed longitudinally between said coupling members and whereby said sleeve becomes united to a pipe of softer metal through the formation of corresponding grooves therein formed by said beads under such compression.

5. In a pipe coupling, the combination of a sleeve of relatively hard ductile metal of uniform diameter and having outer circumferential grooves, coupling members inclosing said sleeve and adapted to compress it longitudinally whereby beads are formed on the interior thereof in alinement with said grooves which are forced into softer metal tubing within said sleeve.

In testimony whereof I affix my signature.

JOHN H. DOHNER.